United States Patent
Robert et al.

(10) Patent No.: US 12,077,692 B2
(45) Date of Patent: Sep. 3, 2024

(54) HMPSA INCORPORATING A PLASTICISER MADE FROM A RENEWABLE RAW MATERIAL

(71) Applicant: BOSTIK SA, Colombes (FR)

(72) Inventors: Christophe Robert, Venette (FR); Amandine Rafaitin, Venette (FR); Lahoucine Idttalbe, Venette (FR)

(73) Assignee: BOSTIK SA, Colombes (FR)

( * ) Notice: Subject to any disclaimer, the term of this patent is extended or adjusted under 35 U.S.C. 154(b) by 151 days.

(21) Appl. No.: 17/433,720

(22) PCT Filed: Feb. 13, 2020

(86) PCT No.: PCT/FR2020/050270
§ 371 (c)(1),
(2) Date: Aug. 25, 2021

(87) PCT Pub. No.: WO2020/174155
PCT Pub. Date: Sep. 3, 2020

(65) Prior Publication Data
US 2022/0041899 A1    Feb. 10, 2022

(30) Foreign Application Priority Data
Feb. 28, 2019  (FR) ..................... 1902046

(51) Int. Cl.
| | |
|---|---|
| *C09J 7/38* | (2018.01) |
| *C08K 5/00* | (2006.01) |
| *C08K 5/01* | (2006.01) |
| *C08L 53/02* | (2006.01) |
| *C09J 7/29* | (2018.01) |
| *C09J 7/35* | (2018.01) |
| *C09J 11/06* | (2006.01) |
| *C09J 11/08* | (2006.01) |
| *C09J 153/02* | (2006.01) |

(52) U.S. Cl.
CPC ............... *C09J 7/35* (2018.01); *C08K 5/0016* (2013.01); *C08K 5/01* (2013.01); *C08L 53/02* (2013.01); *C09J 7/29* (2018.01); *C09J 7/387* (2018.01); *C09J 11/06* (2013.01); *C09J 11/08* (2013.01); *C09J 153/02* (2013.01); *C09J 2301/302* (2020.08); *C09J 2301/304* (2020.08); *C09J 2301/408* (2020.08); *C09J 2301/414* (2020.08); *C09J 2453/00* (2013.01); *C09J 2483/006* (2013.01); *C09J 2491/00* (2013.01); *C09J 2493/00* (2013.01)

(58) Field of Classification Search
None
See application file for complete search history.

(56) References Cited

U.S. PATENT DOCUMENTS

| | | | | |
|---|---|---|---|---|
| 1,947,416 | A | * | 2/1934 | Heck ...................... C08G 63/48 528/295.5 |
| 8,697,795 | B2 | * | 4/2014 | Knoll ..................... C08F 22/14 524/502 |
| 10,717,821 | B2 | * | 7/2020 | Dei Santi ............. C08K 5/5415 |
| 2003/0199605 | A1 | | 10/2003 | Kroll et al. |
| 2006/0154056 | A1 | * | 7/2006 | Imoto .................... C09J 135/06 428/355 AC |
| 2006/0229411 | A1 | | 10/2006 | Hatfield et al. |
| 2008/0064852 | A1 | | 3/2008 | Ddamulira et al. |
| 2009/0022182 | A1 | | 1/2009 | Gollier |
| 2010/0092703 | A1 | | 4/2010 | Fouquay et al. |
| 2016/0032156 | A1 | | 2/2016 | Dollase et al. |

FOREIGN PATENT DOCUMENTS

| | | | |
|---|---|---|---|
| CN | 101730728 A | 6/2010 | |
| CN | 102311712 A | 1/2012 | |
| JP | H 0537942 U | * 5/1993 | ............... C09J 7/02 |
| JP | 2003523477 A | 8/2003 | |
| JP | 2010534353 A | 11/2010 | |
| JP | 2014098155 A | 5/2014 | |
| JP | 2016060847 A | 4/2016 | |
| WO | 99/13016 A1 | 3/1999 | |
| WO | 2008077509 A1 | 7/2008 | |
| WO | 2008110685 A1 | 9/2008 | |

OTHER PUBLICATIONS

Machine translation of JPH 0537942 U (Year: 1993).*
ISA/EP; International Search Report and Written Opinion for International Patent Application No. PCT/FR2020/050270 dated May 28, 2020, 10 pages.

* cited by examiner

*Primary Examiner* — Frank D Ducheneaux
(74) *Attorney, Agent, or Firm* — NK Patent Law

(57) ABSTRACT

1) An HMPSA composition comprising:
   from 20% to 50% by weight of a composition of styrene block copolymers;
   from 35% to 65% by weight of one or more tackifying resins; and
   from 7% to 25% by weight of a plasticizer consisting of a composition comprising a stand oil of a vegetable oil.
2) A multilayer system comprising:
   an adhesive layer (A) consisting of said HMPSA composition;
   a printable support layer (B) adjacent to the adhesive layer (A); and
   a nonstick protective layer (C), adjacent to the adhesive layer (A).
3) The use of said multilayer system for the manufacture of self-adhesive articles.

14 Claims, No Drawings

HMPSA INCORPORATING A PLASTICISER MADE FROM A RENEWABLE RAW MATERIAL

CROSS-REFERENCE TO RELATED APPLICATIONS

This application is a U.S. National Stage application of International Patent Application No. PCT/FR2020/050270, filed on Feb. 13, 2020, which claims the benefit of French Patent Application No. 1902046, filed on Feb. 28, 2019.

The present invention relates to a hot-melt pressure-sensitive adhesive composition (or HMPSA) and also to a multilayer system which comprises a layer constituted by said composition and which is suitable for the manufacture of self-adhesive articles, in particular self-adhesive labels.

Pressure-sensitive adhesives (PSAs) are substances which give the support layer which is coated therewith an immediate tack at ambient temperature. This immediate tack enables the instantaneous adhesion of said self-adhesive support to all types of substrates, under the effect of a gentle and brief pressure. PSAs are widely used for the manufacture of self-adhesive labels which are attached to articles (for example packaging) for the purpose of presenting information (such as barcode, name, price) and/or for decorative purposes. PSAs are also employed in the manufacture of self-adhesive tapes of varied uses. Mention may be made, for example, besides the transparent adhesive tape widely used in daily life, of the forming and the assembling of cardboard packagings; the protection of surfaces for painting operations, in the building industry; the maintenance of electric cables in the transportation industry: the adhesive bonding of fitted carpets by double-sided adhesive tapes.

PSAs are generally applied, by continuous coating processes carried out by industrial machines known as "coaters", over the whole of the surface of a large-sized support layer, where appropriate which is printable, in an amount (generally expressed in $g/m^2$) denoted hereinbelow by the term "weight per unit area". The support layer generally consists of paper or of film of a polymeric material having one or more layers. The layer of self-adhesive composition which covers the support layer is itself covered with a protective nonstick layer (often known as a release liner), which often consists of a silicone film. The multilayer system obtained is generally packaged by winding in the form of large reels (or rolls) up to 2 m in width and 1 m in diameter, which can be stored and transported, such packaging often being referred to by the expression "roll stock".

This multilayer system can subsequently be converted into self-adhesive labels which can be applied by a label manufacturer referred to as a "converter", by means of conversion processes which include the printing of desired informative and/or decorative elements onto the printable face of the support layer, followed by cutting to the desired shape and sizes.

The protective nonstick layer can be easily removed without modifying the adhesive layer, which remains attached to the printable support layer. After separation from its nonstick protective layer, the label is applied in general at a temperature close to ambient temperature to the article (for example the packaging) to be coated, either manually or with the aid of labeling machines on automated packaging lines.

This multilayer system can also be converted into self-adhesive tapes by cutting and packaging as rolls of predetermined width and length.

PSAs advantageously allow, due to their high ambient-temperature tack, rapid holding or attachment of the self-adhesive label and/or tape to the substrate (or article) to be coated (for example, as regards labels, on packagings, or else, as regards tapes, on packing boards to be formed), suitable for obtaining high industrial production rates.

Hot-melt adhesives or hot melts (HMs) are substances that are solid at ambient temperature and contain neither water nor solvent. They are applied in the melt state and solidify on cooling, thus forming a joint which, due to its adhesive strength, attaches the substrates to be assembled. Certain hot melts are formulated in such a way as to give the support coated therewith a relatively hard and tack-free character. Other hot melts provide the support with a relatively soft character and a high tack; these are PSAs which are widely used for the manufacture of self-adhesive articles (for example self-adhesive labels). The corresponding adhesives are denoted by the designation "hot-melt pressure-sensitive adhesives" (or HMPSA). They therefore also make it possible, owing to their adhesive strength, to firmly attach the label or the tape to the desired substrate, whether it is for example packaging to be labeled or board to be assembled.

HMPSAs generally comprise a thermoplastic polymer (in particularly a styrene block copolymer) in combination with tackifying resins and plasticizers.

Such HMPSA compositions and multilayer systems which comprise an adhesive layer consisting of said composition, and also a printable support layer and a protective layer which are adjacent, are known, for example from international applications WO 2008/077509 and WO 2008/110685.

The plasticizers which are used in these HMPSA compositions, and in particular those disclosed by the latter two applications, are generally hydrocarbon oils which are derived from crude oil and which are of paraffinic, aromatic and/or naphthenic nature. Such plasticizers are for example sold under the name Primol® 352 by the company ExxonMobil, and Nyflex® 222B or Nyflex® 223 by the company Nynas.

However, within the current context of the development of "green" chemistry, it is increasingly sought to dispense with, or at the very least to reduce the portion of, nonrenewable raw materials, of petroleum or fossil origin, in favor of renewable raw materials, in particular of plant origin.

There is therefore a need to replace the plasticizers of petroleum origin used in the HMPSA compositions with plasticizers obtained from renewable raw materials.

International application WO 99/13016 describes hot-melt compositions which contain, as plasticizer, a hydrogenated or nonhydrogenated natural oil comprising fatty acids containing from 6 to 22 carbon atoms. Preferred fatty acids are mixtures of C10-C14 carbon atoms, such as coconut oil and C18 mixtures such as soybean and sunflower oil. These hot-melt compositions are used in a process for bonding a substrate based on woven or nonwoven fabric to other substrates, with a view to manufacturing a disposable absorbent product, such as, for example, disposable diapers. However, this document in no way teaches or suggests an HMPSA composition having the adhesive strength and tack properties required for its use in a multilayer system suitable for the manufacture of self-adhesive articles.

One objective of the present invention is to provide, on the one hand, a novel HMPSA composition, the plasticizer of which is made from renewable raw materials and, on the other hand, a multilayer system comprising an adhesive layer consisting of said composition, which are suitable for the manufacture of self-adhesive articles, in particular self-adhesive labels.

Another objective of the present invention is to provide an HMPSA composition suitable for forming the adhesive layer of a multilayer system which also has an appropriate, and even improved, adhesive strength on various substrates.

Another objective of the present invention is to provide an HMPSA composition suitable for forming the adhesive layer of a multilayer system which also has an appropriate, and even improved, tack on various substrates.

It has now been found that these objectives can be achieved, totally or partly, by means of the HMPSA composition and of the multilayer system, the adhesive layer of which consists thereof, as described hereinbelow.

A first subject of the present invention is therefore an HMPSA composition which comprises, on the basis of the total weight of said composition:

from 20% to 50% by weight of a composition (a1) of styrene block copolymers which comprise at least one elastomer block;
from 35% to 65% by weight of one or more tackifying resins (a2); and
from 7% to 25% by weight of a plasticizer (a3);
characterized in that the plasticizer (a3) consists of a composition (a3) comprising a stand oil (a3-1) of a vegetable oil.

Said HMPSA composition, in addition to its reduced content of nonrenewable raw materials due to the use, for the plasticizer, of a vegetable oil derivative, is quite suitable for its use in a multilayer system suitable for the manufacture of self-adhesive articles, and very particularly for the manufacture of self-adhesive labels, owing to its adhesive strength and its tack.

Specifically, said HMPSA composition makes it possible to obtain an adhesive strength (also referred to as "peel"), measured according to the FINAT test method No. 1, which is advantageously greater than 5 N/2.54 cm for metal or polymer substrates, and greater than 3 N/2.54 cm for cardboard substrates. The HMPSA composition according to the invention also makes it possible to obtain a tack, measured according to the "loop" instantaneous adhesion test described in the FINAT test method No. 9, which is advantageously greater than 10 N/2.54 cm on glass substrates, greater than 8 N/2.54 cm on polymer substrates and greater than 3 N/2.54 cm on cardboard substrates.

In addition, both the adhesive strength and the tack are, surprisingly, greatly improved compared to those of HMPSA compositions in which the plasticizer is a vegetable oil such as sunflower, rapeseed, linseed or soybean oil.

Composition (a1) of Styrene Block Copolymers:

The HMPSA composition comprises from 20% to 50% by weight of a composition (a1) of styrene block copolymers which comprise at least one elastomer block.

Said styrene block copolymers have a weight-average molar mass Mw generally of between 50 kDa and 500 kDa. They consist of blocks of various polymerized monomers including at least one polystyrene (or styrenic) block, and are prepared by radical polymerization techniques.

Unless otherwise indicated, the weight-average molar masses $M_w$ that are given in the present text are expressed in daltons (Da) and are determined by gel permeation chromatography, the column being calibrated with polystyrene standards.

According to a preferred embodiment, said composition (a1) consists, on the basis of its total weight:

of 30% to 90% by weight of at least one diblock copolymer chosen from the group comprising SI, SIB, SB, SEB and SEP, and
of 10% to 70% by weight of at least one triblock copolymer chosen from the group comprising SIS, SIBS, SBS, SEBS and SEPS;
the total content of styrene units of said composition (a1) ranging from 10% to 40% by weight on the basis of the total weight of (a1).

The triblock copolymers include 2 polystyrene blocks and 1 elastomer block. They can have various structures: linear, star (also called radial), branched or else comb. The diblock copolymers include 1 polystyrene block and 1 elastomer block.

The triblock copolymers have the general formula:

$$ABA \hspace{4cm} (I)$$

wherein:
A represents a styrene (or polystyrene) non-elastomer block, and
B represents an elastomer block which may be:
polyisoprene. The block copolymer then has the structure: polystyrene-polyisoprene-polystyrene and has the name: SIS;
polyisoprene followed by a polybutadiene block. The block copolymer then has the structure: polystyrene-polyisoprene-polybutadiene-polystyrene and has the name: SIBS;
polybutadiene. The block copolymer then has the structure: polystyrene-polybutadiene-polystyrene and has the name: SBS;
totally or partially hydrogenated polybutadiene. The block copolymer then has the structure: polystyrene-poly(ethylenebutylene)-polystyrene and has the name: SEBS;
totally or partially hydrogenated polyisoprene. The block copolymer then has the structure: polystyrene-poly(ethylenepropylene)-polystyrene and has the name: SEPS.

The diblock copolymers have the general formula:

$$A\text{-}B \hspace{4cm} (II)$$

wherein A and B are as defined previously.

When the composition (a1) comprises several triblock styrene copolymers, the latter being chosen from the group comprising SIS, SBS, SEPS, SIBS and SEBS, it is clearly understood that said triblocks can belong to just one or to several of these 5 copolymer families. The same is true, mutatis mutandis, for the diblock copolymers.

It is preferred to use a composition (a1) comprising a triblock copolymer and a diblock copolymer having the same elastomer block, owing in particular to the fact that such blends are commercially available.

According to one preferred embodiment, the content of diblock copolymer in composition (a1) ranges from 70% to 90% by weight.

The styrene block copolymers comprising an elastomer block, in particular of SI and SIS type, that can be used in the composition (a1) are commercially available, often in the form of triblock/diblock blends.

Europrene® Sol T 166, available from the company Polimeri Europa (Italy), is a blend consisting, respectively, of 90% and 10% of SBS triblock ($M_w$ around 121 kDa) and of SB diblock ($M_w$ around 64 kDa), each of these copolymers having around 30% styrene.

Solprene® 1205, available from the company Dynasol, is an SB diblock copolymer ($M_w$ around 100 kDa) having around 30% styrene.

Kraton® D1183 PT, available from the company Kraton, is a blend consisting, respectively, of 62% and 38% of SIS triblock and SI diblock, having around 16% styrene.

Kraton® D1118, available from the company Kraton, is a blend consisting, respectively, of 22% and 78% of SBS triblock and SB diblock, having around 33% styrene.

According to a preferred variant, the HMPSA composition comprises from 25% to 45% by weight of the composition (a1) of styrene block copolymers, and even more preferentially from 31% to 40% by weight.

Tackifying Resins (a2):

The HMPSA composition comprises from 35% to 65% by weight of one or more tackifying resins (a2).

The tackifying resin(s) (a2) that can be used have weight-average molar masses $M_w$ of generally between 300 and 7000 Da and are chosen in particular from:
  (i) rosins of natural origin or modified rosins, such as, for example, the rosin extracted from pine gum, wood rosin extracted from tree roots and derivatives thereof which are hydrogenated, dehydrogenated, dimerized, polymerized or esterified with monoalcohols or polyols, such as glycerol;
  (ii) resins obtained by hydrogenation, polymerization or copolymerization (with an aromatic hydrocarbon) of mixtures of unsaturated hydrocarbons having around 5, 9 or 10 carbon atoms derived from petroleum cuts;
  (iii) terpene resins generally resulting from the polymerization of terpene hydrocarbons, such as, for example, monoterpene (or pinene), in the presence of Friedel-Crafts catalysts, which are optionally modified by the action of phenols;
  (iv) copolymers based on natural terpenes, for example styrene/terpene, α-methylstyrene/terpene and vinyltoluene/terpene.

The tackifying resin(s) (a2) have a softening temperature generally of between 5° C. and 150° C.

The softening temperature (or point) of the tackifying resins which can be used in the composition according to the invention may vary from 5° C. to 140° C. The softening temperature is determined in accordance with the standardized test ASTM E 28, the principle of which is as follows. A brass ring with a diameter of approximately 2 cm is filled with the resin to be tested, in the molten state. After cooling to ambient temperature, the ring and the solid resin are placed horizontally in a thermostated glycerol bath, the temperature of which can vary by 5° C. per minute. A steel ball with a diameter of approximately 9.5 mm is centered on the disk of solid resin. The softening temperature is, during the phase of temperature increase of the bath at a rate of 5° C. per minute, the temperature at which the disk of resin yields by a height of 25.4 mm under the weight of the ball.

According to a preferred embodiment, the tackifying resin(s) used have a softening temperature of between 80° C. and 120° C., even more preferentially between 90° C. and 110° C.

The tackifying resins are commercially available, and mention may be made for example in the above families of the following products:
  family (i): Sylvalite® RE 100S from Arizona Chemical (ester of rosin and pentaerythritol), having a softening temperature of around 100° C.;
  family (ii): Escorez® 2203LC from ExxonMobil Chemical, having a softening temperature of around 93° C.

According to a preferred variant, the HMPSA composition comprises from 40% to 60% of tackifying resins (a2), even more preferentially from 40% to 55% by weight.

Plasticizer (a3):

The HMPSA composition comprises from 7% to 25% by weight of a plasticizer (a3) which consists of a composition (a3) comprising a stand oil (a3-1) of a vegetable oil.

The vegetable oil stand oil (a3-1) is obtained by a process which comprises a step of heating said vegetable oil in the absence of oxygen at a temperature above 200° C., preferably above 270° C., and even more preferentially between 270° C. and 360° C.

It is generally accepted that this heating causes a thermal polymerization reaction of the oil, which involves in particular the polymerization of the double bonds and the crosslinking of the corresponding triglycerides, which has the effect of increasing the viscosity of said oil. This reaction is often referred to as a "standolization reaction".

The heating of the vegetable oil is maintained for a time corresponding to the obtaining, for the stand oil (a3-1), of a Brookfield viscosity, measured at 20° C., of greater than or equal to 50 mPa·s, preferably 100 mPa·s. Said viscosity is generally less than 100 Pa·s, preferably less than 60 Pa·s.

According to a preferred variant, the stand oil (a3-1) is a stand oil of a vegetable oil, of which the derived fatty acids comprise a proportion of at least 75% of fatty acids including from 16 to 22 carbon atoms, said proportion being expressed as a percentage by weight on the basis of the total weight of the fatty acids derived from said oil.

A vegetable oil is a composition of triple esters of fatty acids and of glycerol (also called "triglycerides"). It is obtained from the seeds of plants and many of course are vegetable oils that are widely available commercially.

The expression "fatty acids derived from the vegetable oil" is thus intended to denote the fatty acids present in the molecular structure of these triglycerides. Said fatty acids can be obtained, in the form of isolated compounds, by saponification, hydrolysis or methanolysis of said triglycerides.

The proportion of fatty acids including from 16 to 22 carbon atoms is more preferably at least 80% by weight, and even more preferentially at least 85% by weight, on the basis of the total weight of the fatty acids derived from the vegetable oil.

According to a very particularly preferred variant, the stand oil (a3-1) is a stand oil of a vegetable oil chosen from sunflower, rapeseed, linseed and soybean oil.

According to one embodiment, the vegetable oil stand oil (a3-1) is a soybean oil stand oil, the Brookfield viscosity of which, measured at 20° C., is greater than or equal to 200 mPa·s, preferably included in the range from 0.2 to 9 Pa·s, particularly in the range from 0.2 to 5 Pa·s.

According to another embodiment, the vegetable oil stand oil (a3-1) is a linseed oil stand oil, the Brookfield viscosity of which, measured at 20° C., is greater than or equal to 100 mPa·s, preferably included in the range from 0.1 to 60 Pa·s, particularly in the range from 2 to 10 Pa·s.

Stand oils are commercially available, and mention may be made for example:
  as soybean stand oil, of Veopol® 315002, the Brookfield viscosity of which at 20° C. is 267 mPa·s and of Veopol® 215035, the Brookfield viscosity of which at 20° C. is 4420 mPa·s;
  as linseed stand oil, of Veopol® 212055, the Brookfield viscosity of which at 20° C. is 5870 mPa·s.

These products are available from the company Vandeputte.

According to a preferred variant, the composition (a3) which can be used as a plasticizer consists of one (or more) stand oil(s) (a3-1).

According to another variant, the composition (a3) which can be used as a plasticizer comprises, in addition to a stand oil (a3-1), a vegetable oil (a3-2) which is chosen from sunflower, rapeseed, linseed and soybean oil and of which the derived fatty acids comprise a proportion of at least 75% of fatty acids including from 16 to 22 carbon atoms, said percentage being a percentage by weight expressed on the basis of the total weight of the fatty acids derived from the vegetable oil (a3-2). The vegetable oil (a3-2) may be identical to or different from the vegetable oil from which stand oil (a3-1) is obtained.

In accordance with the latter variant, the composition (a3) comprises from 50% to 100% of the stand oil (a3-1) and from 0 to 50% of the vegetable oil (a3-2), these percentages being percentages by weight expressed on the basis of the total weight of the composition (a3).

The proportion of fatty acids including from 16 to 22 carbon atoms in the total weight of fatty acids derived from the vegetable oil (a3-2) is preferably at least 80% by weight, and even more preferentially at least 85% by weight.

According to a preferred variant, the HMPSA composition comprises from 7% to 20% by weight of plasticizer (a3), and more preferentially from 10% to 19%, and even more preferentially from 10% to 15% by weight.

Stabilizers (a4):

According to a preferred embodiment, the HMPSA composition further comprises from 0.1% to 2% of one or more stabilizers (or antioxidants) (a4).

These compounds are introduced in order to protect said composition from degradation resulting from a reaction with oxygen which is liable to be formed by the action of heat, light or residual catalysts on certain raw materials, such as the tackifying resins. These compounds can include primary antioxidants, which trap free radicals and are generally substituted phenols, such as Irganox® 1010 from BASF. The primary antioxidants can be used alone or in combination with other antioxidants, such as phosphites, for instance Irgafos® 168 also from BASF, or else with UV-stabilizers such as amines Wax (a5):

The HMPSA composition according to the invention can also include a wax (a5) of a polyethylene homopolymer (such as A-C® 617 from Honeywell) or of a copolymer of polyethylene and vinyl acetate. The corresponding amount may range up to 5%.

Finally, it can optionally include pigments, dyes or fillers.

According to one preferred variant, the HMPSA composition comprises, and preferably essentially consists of:
from 25% to 45% by weight of the composition (a1) of styrene block copolymers;
from 40% to 60% by weight of the compatible tackifying resin(s) (a2); and
from 7% to 20% by weight of the plasticizer (a3).

According to one even more preferred variant, the HMPSA composition comprises, and preferably essentially consists of:
from 31% to 40% by weight of the composition (a1) of styrene block copolymers;
from 40% to 55% by weight of the compatible tackifying resin(s) (a2); and
from 10% to 19% by weight of the plasticizer (a3).

The viscosity of the HMPSA composition, measured by a Brookfield® RVT viscometer at 163° C., is between 4 and 50 Pa·s, preferably between 10 and 40 Pa·s. Such a viscosity is particularly well suited to the nozzles used in the industrial units of the coaters for the coating thereof on a printable support layer.

The self-adhesive hot-melt composition according to the invention is prepared by simple mixing of its components at a temperature between 130° C. and 200° C., until a homogeneous mixture is obtained. The required mixing techniques are well known to those skilled in the art.

A second subject of the present invention is a multilayer system comprising:
an adhesive layer (A) consisting of the HMPSA composition which is a subject of the invention;
a support layer (B) adjacent to the adhesive layer (A); and
a nonstick protective layer (C), adjacent to the adhesive layer (A).

Adhesive Layer (A):

According to a preferred variant of the multilayer system according to the invention, the thickness of the adhesive layer (A) is strictly greater than 10 μm, preferably within a range of from 11 to 100 μm, more preferentially from 12 to 35 μm.

Support Layer (B):

The support layer (B) included in the multilayer system according to the invention is adjacent to the adhesive layer (A).

According to a more preferred variant of the invention, said layer (B) consists of paper or of a film comprising one or more homogeneous layers of a polymer.

Among the suitable polymers, mention may be made of polyolefins, such as polyethylene, including high-density polyethylene, low-density polyethylene, linear low-density polyethylene and linear ultra-low-density polyethylene; polypropylene and polybutylenes; polystyrene; natural or synthetic rubber; vinyl copolymers, such as polyvinyl chloride, which may or may not be plasticized, and poly(vinyl acetate); olefinic copolymers, such as ethylene/methacrylate copolymers, ethylene/vinyl acetate copolymers, acrylonitrile/butadiene/styrene copolymers, and ethylene/propylene copolymers; acrylic polymers and copolymers; polyurethanes; polyethers; polyesters; and mixtures thereof.

Preferably, the support layer (B) is based on acrylic polymers, on polyethylene (PE), polypropylene (PP), which is oriented, non-oriented or biaxially oriented, polyimide, polyurethane, or polyester, such as polyethylene terephthalate (PET).

According to yet another variant, the support layer (B) is a printable support layer.

Nonstick Protective Layer (C):

The protective nonstick layer (C) can be easily removed without modifying the layer (A), which remains attached to the support layer (B).

According to a preferred variant, said layer (C) comprises a silicone-based material, said material either constituting said layer (C), or being present in the form of a surface coating of said layer (C), said coating being intended to be in contact with the adhesive layer (A).

According to a preferred variant of the multilayer system according to the invention, said system is packaged in the form of a winding around a reel (or roll), the dimensions of which can vary within a wide range. Thus, the diameter of such a roll may range from 0.25 to 1 m, and its width from 0.25 to 2 m.

According to this preferred variant, the protective nonstick layer (C) consists of the support layer (B) included in the multilayer system, wherein the face which is opposite the face in contact with the adhesive layer (A) is coated with a silicone-based material. Such a multilayer system in which the protective nonstick layer (C) is not distinct from the layer (B) is sometimes denoted by the name "linerless". Said packaging is particularly advantageous, because of its simplicity and the resulting economy, for converters who convert these roll stocks into final self-adhesive articles, such as labels or self-adhesive tapes.

The HMPSA composition is applied in the melt state at a temperature above 130° C. on the support layer (B) in an amount which is strictly greater than 10 g/m² and which generally ranges from 11 to 100 g/m², preferably from 11 to 35 g/m², to form the adhesive layer (A).

The application is carried out by known coating techniques such as for example lipped-nozzle coating (at a temperature of around 160° C. to 180° C.) or curtain coating (at a temperature of around 120° C. to 180° C.). The HMPSA is generally applied by a lipped nozzle onto the nonstick protective layer (C), the assembly then being laminated to the support layer (B) (transfer coating). The application of the HMPSA by curtain coating may be carried out directly on the support layer (B), depending on the coating temperature.

The present invention also relates to the use of the multilayer system as defined above for the manufacture of self-adhesive articles, such as self-adhesive labels and adhesive tapes.

Another subject of the invention is a self-adhesive label capable of being obtained by conversion of the multilayer system described above. In this case, a printable support layer (B) is preferred.

The conversion process carried out generally includes:
a step of printing onto the printable support layer (B), then
a step of cutting the multilayer system so as to reduce the width thereof, and therefore to repackage it on a reel of smaller width; then
a step (termed "stripping") of obtaining a multilayer system, packaged on the reel of the preceding step, wherein the unchanged nonstick protective layer (C) is bonded just to the part of the printed support layer that corresponds to the shape and dimensions of the self-adhesive label designed for its final use. This step therefore consists in selectively cutting it and then removing the undesirable part of the printable support layer (B) and of the adhesive layer (A), said part often being termed the "backbone of the label".

The latter multilayer system is employed on lines for packaging articles to be labeled, such as, for example, packages, by means of automated systems which separate the self-adhesive labels from the protective layer, and attach them to the articles to be labeled. The labeled article is preferably a package or container consisting of:
glass;
a usual plastic material chosen from polyethylene terephthalate (PET), polyvinyl chloride (PVC), polyethylene (PE), in particular high-density polyethylene (HDPE), or else polypropylene (PP); or
cardboard, such as for example the cardboard known under the name FIPAGO cardboard (name originating from the Federation Internationale des fabricants de PApiers GOmmés (International Federation of the Manufacturers of Gummed Papers), of Kraftliner grade and weight per unit area 200 g/m².

The following examples are given purely by way of illustration of the invention and should not be interpreted so as to limit the scope thereof.

EXAMPLES A (REFERENCE), EXAMPLES 1 TO 6 (ACCORDING TO THE INVENTION) AND B, C, D (COMPARATIVE)

The compositions appearing in table 1 below are prepared by simple hot mixing at 180° C. of the ingredients indicated.

The Brookfield viscosity of these compositions was measured at a temperature of 163° C. The result is indicated in table 2 in mPa·s.

These compositions were also tested according to the tests described below.

Adhesive Strength: Peel Test

The adhesive strength of the compositions is evaluated by the 180° peel test on a plate of a certain substrate, as described in the FINAT test method No. 1, published in the FINAT Technical Handbook, 6$^{th}$ edition, 2001. FINAT is the International Federation of Self-Adhesive Label Manufacturers and Converters.

The principle of this test is as follows: A support layer consisting of a 50 µm thick PET film is precoated with the HMPSA in an amount of 20 g/m².

A test specimen in the form of a rectangular strip (25.4 mm×175 mm) is cut from the self-adhesive support thus obtained. This test specimen is fastened to a plate consisting of a certain substrate. The assembly obtained is left at ambient temperature for 20 minutes. It is then introduced into a tensile testing device capable of performing the peeling or detachment of the strip at an angle of 180° and with a separation speed of 300 mm per minute. The device measures the force required to detach the strip under these conditions.

The result is expressed in N/2.54 cm and is indicated, along with the nature of the substrate of the plate, in table 2.

Immediate Tack: Loop Tack Test

The immediate tack of the compositions is evaluated by the loop tack test described in FINAT test method No. 9.

A support layer consisting of a 50 µm thick PET film is precoated with the HMPSA in an amount of 20 g/m² so as to obtain a rectangular strip of 25.4 mm by 175 mm. The two ends of this strip are joined together so as to form a loop, the adhesive layer of which is facing outward. The two joined ends are placed in the movable jaw of a tensile testing device capable of imposing a rate of displacement of 300 mm/minute along a vertical axis with the possibility of back-and-forth motion. The lower part of the loop placed in the vertical position is first brought into contact with a horizontal plate of a certain substrate of 25 mm by 30 mm over a square area measuring about 25 mm per side. Once this contact has been established, the direction of displacement of the jaw is reversed. The immediate tack is the maximum value of the force required for the loop to become completely detached from the substrate plate.

The result is expressed in N/2.54 cm and is indicated, along with the nature of the substrate of the horizontal plate, in table 2.

The peel and tack results obtained for examples 1 to 6 based on a plasticizer consisting of stand oils are generally of the same order as those of example A, the plasticizer of which is of petroleum origin.

Said results are also significantly improved compared to the results obtained for examples B, C and D based on vegetable oil.

TABLE 1

| | Ingredient | Ex. A (ref.) | Ex. 1 | Ex. 2 | Ex. 3 | Ex. 4 | Ex. 5 | Ex. 6 | Ex. B (comp.) | Ex. C (comp.) | Ex. D (comp.) |
|---|---|---|---|---|---|---|---|---|---|---|---|
| (a1) | Europrène ® Sol T 166 | 4.5 | 5.4 | 5.2 | 5 | 4.5 | 5.2 | — | 4.5 | 4.5 | — |
| | Kraton ® D1183 PT | 3 | 3.8 | 3.65 | 3 | 3 | 3.65 | — | 3 | 3 | — |
| | Solprene ® 1205 | 26.6 | 30.9 | 29.75 | 28.6 | 26.6 | 29.75 | — | 26.6 | 26.6 | — |
| | Kraton ® D1118 | — | — | — | — | — | — | 33.9 | — | — | 33.9 |
| (a2) | Sylvalite ® RE 100S | 34 | 34 | 34 | 34 | 34 | 34 | 37.4 | 34 | 34 | 37.4 |
| | Escorez ® 2203LC | 11 | 11 | 11 | 11 | 11 | 11 | 13.4 | 11 | 11 | 13.4 |
| (a3) | Nyflex ® 223 | 17.5 | — | — | — | — | — | — | — | — | — |
| | Soybean stand oil Veopol ® 315002 | — | 11.5 | 13 | 14.5 | 17.5 | — | — | — | — | — |
| | Soybean stand oil Veopol ® 215035 | — | — | — | — | — | 13 | — | — | — | — |
| | Linseed stand oil Veopol ® 212055 | — | — | — | — | — | — | 14.8 | — | — | — |
| | Sunflower oil | — | — | — | — | — | — | — | 17.5 | — | — |
| | Rapeseed oil | — | — | — | — | — | — | — | — | 17.5 | — |
| | Linseed oil | — | — | — | — | — | — | — | — | — | 14.8 |
| (a4) | Irganox ® 1010 | 1.4 | 1.4 | 1.4 | 1.4 | 1.4 | 1.4 | 0.5 | 1.4 | 1.4 | 0.5 |
| (a5) | A-C ® 8 | 2 | 2 | 2 | 2 | 2 | 2 | — | 2 | 2 | — |

TABLE 2

| Measurement and tests | Ex. A (ref.) | Ex. 1 | Ex. 2 | Ex. 3 | Ex. 4 | Ex. 5 | Ex. 6 | Ex. B (comp.) | Ex. C (comp.) | Ex. D (comp.) |
|---|---|---|---|---|---|---|---|---|---|---|
| Brookfield Viscosity at 163° C. (in mPa · s) | 13250 | 33300 | 27700 | 22800 | 15450 | 32000 | 15650 | 14000 | 13650 | 8900 |
| Peel on stainless steel (N/2.54 cm) | 15.4 | 17.7 | 15.1 | 13.0 | 10.3 | 23.7 | 25.4 | 5.6 | 8.3 | 17.6 |
| Peel on HDPE (N/2.54 cm) | 15.3 | 17.2 | 14.6 | 13.0 | 10.4 | 20.5 | 17.0 | 5.4 | 7.5 | 7.8 |
| Peel on PP (N/2.54 cm) | 15.7 | 17.5 | 14.5 | 13.4 | 10.3 | 22.7 | 26.0 | 5.8 | 7.6 | 19.0 |
| Peel on Fipago cardboard (N/2.54 cm) | 10.1 | 15.3 | 11.3 | 8.9 | 7.0 | 16.5 | 3.9 | 3.4 | 3.3 | 4.6 |
| Loop tack on glass (N/2.54 cm) | 32.2 | 35.5 | 31.9 | 29.7 | 24.2 | 43.3 | 47.1 | 15.7 | 17.9 | 25.2 |
| Loop tack on HDPE (N/2.54 cm) | 22.2 | 13.1 | 20.1 | 23.1 | 23.6 | 14.9 | 22.6 | 15.6 | 17.5 | 15.3 |
| Loop tack on PP (N/2.54 cm) | 29.2 | 35.3 | 31.5 | 29.2 | 23.6 | 35.0 | 32.6 | 16.1 | 17.4 | 16.0 |
| Loop tack on Fipago cardboard (N/2.54 cm) | 8.4 | 7.8 | 7.5 | 7.3 | 8.1 | 9.0 | 3.1 | 5.9 | 5.9 | 8.5 |

The invention claimed is:

1. An HMPSA composition which comprises, on the basis of the total weight of said composition:
   from 31%-45% by weight of a composition (a1) of styrene block copolymers which comprise at least one elastomer block;
   from 40%-55% by weight of one or more tackifying resins (a2); and
   from 10%-19% by weight of a plasticizer (a3);
   wherein the plasticizer (a3) has a composition (a3) comprising a stand oil (a3-1) of a vegetable oil.

2. The HMPSA composition as claimed in claim 1, wherein the composition (a1) of styrene block copolymers comprises, on the basis of its total weight:
   from 30% to 90% by weight of at least one copolymer selected from the group consisting of SI, SIB, SB, SEB and SEP, and
   from 10% to 70% by weight of at least one copolymer selected from the group consisting of SIS, SIBS, SBS, SEBS and SEPS;
   wherein the total content of styrene units of said composition (a1) ranges from 10% to 40% by weight on the basis of the total weight of (a1).

3. The HMPSA composition as claimed in claim 1, wherein the one or more tackifying resins (a2) is selected from the group consisting of:
   (i) rosins of natural origin or modified rosins and derivatives of both rosins of natural origin and modified rosins which are hydrogenated, dehydrogenated, dimerized, polymerized or esterified with monoalcohols or polyols;
   (ii) resins obtained by hydrogenation, polymerization or copolymerization (with an aromatic hydrocarbon) of mixtures of unsaturated hydrocarbons having 5, 9 or 10 carbon atoms derived from petroleum cuts;
   (iii) terpene resins resulting from the polymerization of terpene hydrocarbons in the presence of Friedel-Crafts catalysts, which are optionally modified by the action of phenols; and
   (iv) copolymers based on natural terpenes.

4. The HMPSA composition as claimed in claim 1, wherein the vegetable oil stand oil (a3-1) is obtained by a process comprising a step of heating said vegetable oil in the absence of dioxygen at a temperature above 200° C.

5. The HMPSA composition as claimed in claim 4, wherein the stand oil (a3-1) has a Brookfield viscosity, measured at 20° ° C., of greater than or equal to 50 mPa·s.

6. The HMPSA composition as claimed in claim 1, wherein the stand oil (a3-1) is a stand oil of a vegetable oil, wherein the vegetable oil is a composition of triple esters of fatty acids and glycerol, wherein at least 75% of the fatty acids in the triple esters include from 16 to 22 carbon atoms, said proportion being expressed as a percentage by weight on the basis of the total weight of the fatty acids in the triple esters.

7. The HMPSA composition as claimed in claim 1, wherein the stand oil (a3-1) is a stand oil of a vegetable oil selected from the group consisting of sunflower, rapeseed, linseed and soybean oil.

8. The HMPSA composition as claimed in claim 1, wherein the plasticizer composition (a3) consists of the stand oil (a3-1).

9. The HMPSA composition as claimed in claim 1, wherein the plasticizer composition (a3) comprises, in addition to the stand oil (a3-1), a vegetable oil (a3-2) selected from the group consisting of sunflower, rapeseed, linseed and soybean oil, wherein the vegetable oil is a composition of triple esters of fatty acids and glycerol, wherein at least 75% of fatty acids in the triple esters include from 16 to 22 carbon atoms, said percentage being a percentage by weight expressed on the basis of the total weight of the fatty acids in the triple esters.

10. A multilayer system comprising:
    an adhesive layer (A) comprising the HMPSA composition as defined in claim 1;
    a support layer (B) adjacent to the adhesive layer (A); and
    a nonstick protective layer (C), adjacent to the adhesive layer (A).

11. The multilayer system as claimed in claim 10, wherein a thickness of the adhesive layer (A) is strictly greater than 10 μm.

12. The multilayer system as claimed in claim 10, wherein the multilayer system is packaged in the form of a winding around a reel.

13. The multilayer system as claimed in claim 12, wherein the protective nonstick layer (C) comprises a silicone-based material coated on a face of the support layer (B) which is opposite a face in contact with the adhesive layer (A).

14. A self-adhesive article comprising the multilayer system as defined in claim 10.

* * * * *